US009313282B2

(12) United States Patent
Bank et al.

(10) Patent No.: US 9,313,282 B2
(45) Date of Patent: Apr. 12, 2016

(54) INTELLIGENTLY DETECTING THE LEADER OF A CO-BROWSING SESSION

(71) Applicant: International Business Machines Corporation, Armonk, NY (US)

(72) Inventors: Judith H. Bank, Cary, NC (US); Lisa M. Bradley, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 13/769,492

(22) Filed: Feb. 18, 2013

(65) Prior Publication Data

US 2014/0237039 A1    Aug. 21, 2014

(51) Int. Cl.
*H04L 29/06* (2006.01)
*H04L 29/08* (2006.01)

(52) U.S. Cl.
CPC ............... *H04L 67/22* (2013.01); *H04L 67/14* (2013.01); *H04L 67/24* (2013.01); *H04L 65/403* (2013.01); *H04L 65/4015* (2013.01)

(58) Field of Classification Search
CPC ......... G06F 15/00; G06F 15/16; G06F 15/17; G06F 15/173; G06F 3/01; G06F 9/44; H04L 12/24
USPC ......... 709/204, 205, 208, 209, 213, 217, 218, 709/219, 231, 248
See application file for complete search history.

(56) References Cited

U.S. PATENT DOCUMENTS

| | | | | |
|---|---|---|---|---|
| 5,440,624 A * | 8/1995 | Schoof, II | ............... | 379/202.01 |
| 5,471,461 A * | 11/1995 | Engdahl et al. | ............... | 370/252 |
| 5,907,324 A * | 5/1999 | Larson et al. | ............... | 715/753 |
| 5,954,798 A * | 9/1999 | Shelton et al. | ............... | 709/224 |
| 6,361,440 B1 * | 3/2002 | Ogawa et al. | ............... | 463/42 |
| 6,708,172 B1 * | 3/2004 | Wong et al. | | |
| 6,732,145 B1 | 5/2004 | Aravamudan et al. | | |
| 6,823,363 B1 * | 11/2004 | Noveck et al. | ............... | 709/204 |
| 6,971,110 B1 * | 11/2005 | Marks et al. | ............... | 719/318 |
| 7,124,164 B1 * | 10/2006 | Chemtob | ............... | 709/204 |
| 7,149,776 B1 * | 12/2006 | Roy et al. | ............... | 709/205 |
| 7,287,054 B2 * | 10/2007 | Lee et al. | ............... | 709/204 |
| 7,441,000 B2 * | 10/2008 | Boehringer et al. | ............... | 709/203 |
| 7,653,543 B1 * | 1/2010 | Blair et al. | ............... | 704/270 |
| 7,664,861 B2 * | 2/2010 | Guntupalli et al. | ............... | 709/227 |
| 7,831,679 B2 * | 11/2010 | Apacible et al. | ............... | 709/209 |
| 7,849,145 B2 * | 12/2010 | Kang et al. | ............... | 709/206 |
| 7,870,209 B2 * | 1/2011 | Brochu et al. | ............... | 709/206 |
| 7,953,623 B2 * | 5/2011 | Ogle et al. | ............... | 705/7.29 |
| 7,987,269 B1 * | 7/2011 | Mayhead et al. | ............... | 709/226 |
| 8,010,901 B1 * | 8/2011 | Rogers | ............... | 715/751 |

(Continued)

OTHER PUBLICATIONS

How to Use IRC-Style Commands in a Skype Chat; Dan York; disruptivetelephony.com; Mar. 19, 2011.*

(Continued)

*Primary Examiner* — Brian J Gillis
*Assistant Examiner* — Boris Grijalva Lobos
(74) *Attorney, Agent, or Firm* — David B. Woycechowsky

(57) ABSTRACT

Managing a co-browsing session of multiple users where there are multiple roles that each user may have, and each respective user has a role. Software manages a computer system to: (i) monitor the co-browsing session to detect a condition; and (ii) responsive to detection of the condition, change the role(s) of at least one user. The change of role(s) is made automatically and without human intervention.

2 Claims, 5 Drawing Sheets

(56) References Cited

U.S. PATENT DOCUMENTS

| | | | |
|---|---|---|---|
| 8,041,773 B2* | 10/2011 | Abu-Ghazaleh et al. | 709/209 |
| 8,095,120 B1* | 1/2012 | Blair et al. | 455/416 |
| 8,150,920 B2* | 4/2012 | Forstadius | 709/205 |
| 8,275,108 B2* | 9/2012 | O'Sullivan et al. | 379/202.01 |
| 8,370,189 B2* | 2/2013 | Denner et al. | 705/7.19 |
| 8,376,834 B2* | 2/2013 | Hirzel et al. | 463/23 |
| 8,432,823 B2* | 4/2013 | Quadri et al. | 370/252 |
| 8,548,146 B2* | 10/2013 | Soo et al. | 379/202.01 |
| 8,806,035 B2* | 8/2014 | Gargi | 709/229 |
| 8,856,259 B2* | 10/2014 | Burckart et al. | 709/208 |
| 8,886,720 B2* | 11/2014 | Serr et al. | 709/204 |
| 2002/0198941 A1* | 12/2002 | Gavrilescu et al. | 709/205 |
| 2003/0046344 A1* | 3/2003 | Kumhyr et al. | 709/205 |
| 2004/0199580 A1* | 10/2004 | Zhakov et al. | 709/204 |
| 2004/0225716 A1* | 11/2004 | Shamir et al. | 709/204 |
| 2005/0246422 A1* | 11/2005 | Laning | 709/205 |
| 2006/0184886 A1* | 8/2006 | Chung et al. | 715/758 |
| 2010/0050093 A1* | 2/2010 | Behrens et al. | 715/753 |
| 2010/0083135 A1* | 4/2010 | Zawacki et al. | 715/753 |
| 2010/0218105 A1* | 8/2010 | Perov et al. | 715/738 |
| 2011/0010640 A1 | 1/2011 | Fox et al. | |
| 2011/0314397 A1* | 12/2011 | Ogle et al. | 715/764 |
| 2012/0185784 A1* | 7/2012 | Katz | 715/760 |
| 2013/0138770 A1* | 5/2013 | Kim et al. | 709/217 |
| 2014/0006915 A1* | 1/2014 | Bank et al. | 715/205 |
| 2014/0132702 A1* | 5/2014 | Leibovich et al. | 348/14.08 |

OTHER PUBLICATIONS

U.S. Appl. No. 13/535,947, entitled "Webpage Browsing Synchronization in a Real Time Collarboration," filed Jun. 28, 2012.

* cited by examiner

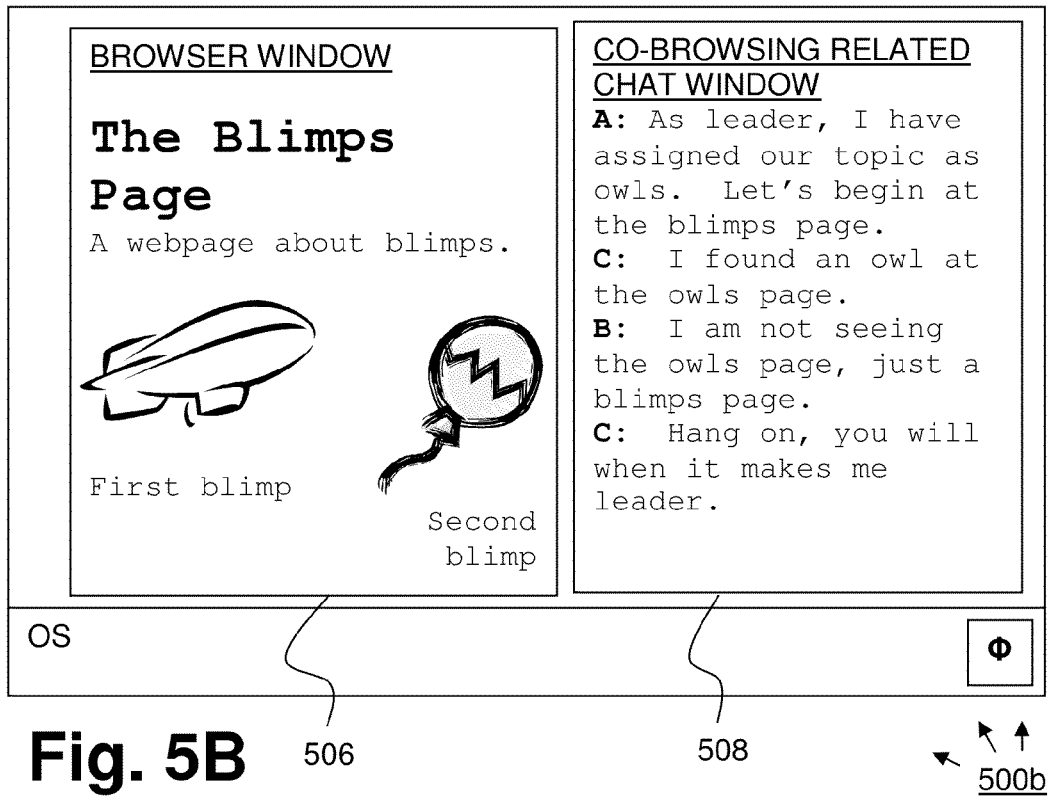

INTELLIGENTLY DETECTING THE LEADER OF A CO-BROWSING SESSION

FIELD OF THE INVENTION

The present invention relates generally to the field of co-browsing web sessions Where the co-browsers act in various "roles," and more specifically to co-browsing web sessions where at least one co-browser has the role of "leader."

BACKGROUND OF THE INVENTION

Online communications are an important collaboration technique for real time collaboration, which is also known as chat communications, and information sharing between individuals. In a real time collaboration (also referred to as a collaborative browsing session or co-browsing session), participants each participate on respective computers and communicate with each other through a network. Although chat sessions may include a large group of participants, chat sessions may consist of as few as two participants. Chat sessions are utilized for a variety of different types of environments. For example chat sessions may be used for customer service support, business consultation, academic meetings, and more. These chat sessions provide a quick means to exchange information which may be difficult to exchange through more traditional avenues of real time collaboration. It is common for participants to discuss specific content, such as a webpage or document, in an online chat. In this scenario, a participant may send a uniform resource locater (URL) to the other participants in the chat session, and may focus the chat on a specific section of content in the webpage.

It is known to have co-browsing chat sessions where multiple users (see the DEFINITIONS sub-section of the DETAILED DESCRIPTION section) co-operatively browse a computer network, such as the internet. These co-browsing sessions: (i) may be performed through a "chat type" interface; (ii) are usually co-operative in nature; (iii) may have different predesignated "roles" for the co-browser users; (iv) may use a system of roles that includes the roles of "leader" and "non-leader;" and/or (v) may allow only one user to assume the role of leader at any given time during the co-browsing session. For co-browsing systems with leaders, it is a known technique to change the leader of the session by a specific and overt request from one of the users of the co-browsing session.

SUMMARY

According to an aspect of the present invention, there is a method for managing a co-browsing session of multiple users where each respective user has at least one role selected from a set of at least two possible roles. The method includes the following steps (not necessarily in the following order): (i) monitoring the co-browsing session to detect a condition; and (ii) responsive to detection of the condition, changing the role(s) of at least one user. At the changing step, the change of role(s) is made automatically and without human intervention. At least the changing step is performed by computer software running on computer hardware.

According to a further aspect of the present invention, there is a method of allocating a leader of a collaborative browsing session that includes a multiple users, including a first user. The users interactively access a computer network to perform the collaborative browsing session. The method includes the following steps (not necessarily in the following order): (i) detecting a hierarchical relationship between and among the users; and (ii) assigning at least one role, of a plurality of possible roles, with respect to the collaborative browsing session to the first user based, at least in part, upon the hierarchical relationship.

BRIEF DESCRIPTION OF THE SEVERAL VIEWS OF THE DRAWINGS

FIG. 5B is a second screenshot generated by the first embodiment computer system.

DETAILED DESCRIPTION

Figure 1:
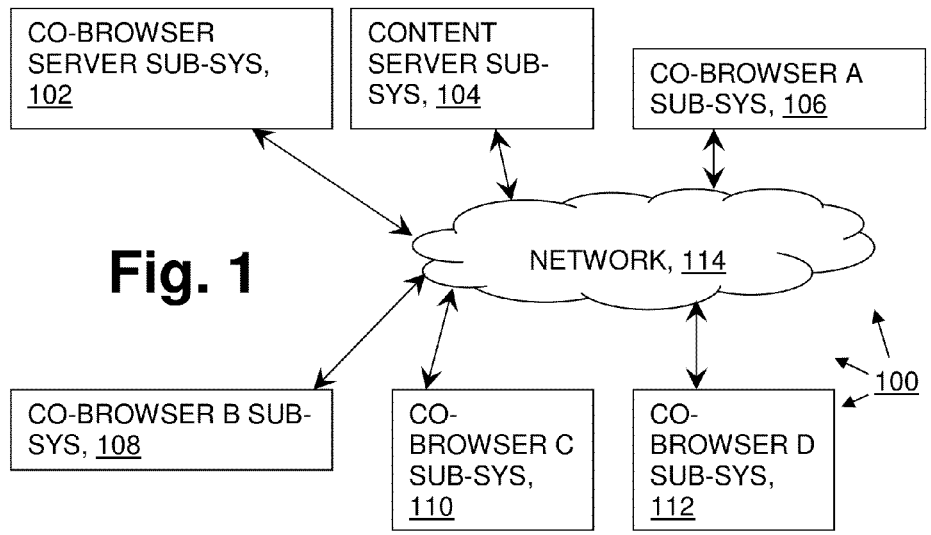
FIG. 1 is a schematic view of a first embodiment of a computer system according to the present invention.

The DETAILED DESCRIPTION section will be divided into the following sub-sections: (i) The Hardware and Software Environment; (ii) Operation of Embodiment(s) of the Present Invention; and (iii) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 2:
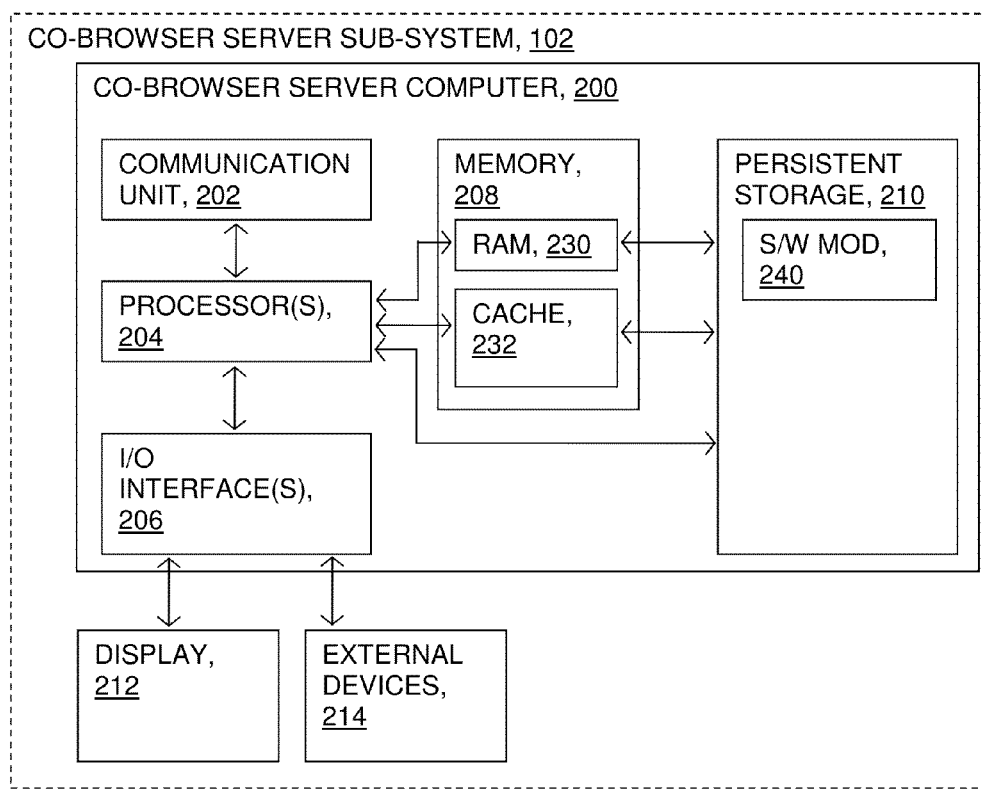
FIG. 2 is a schematic view of a portion of the first embodiment computer system.
Figure 3:
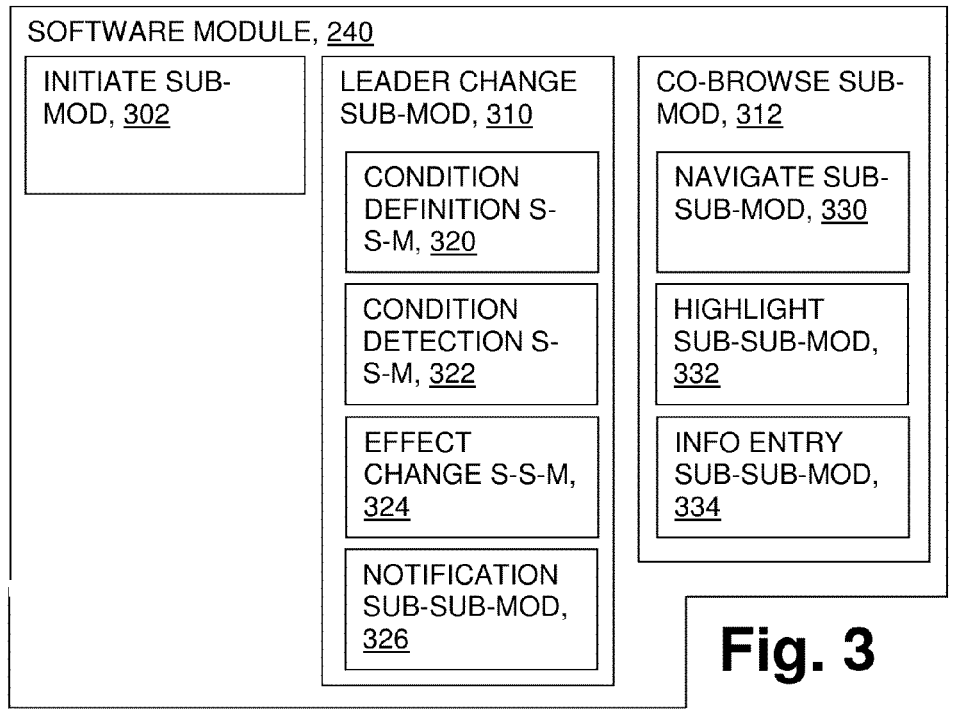
FIG. 3 is a schematic view of a portion of the first embodiment computer system.

The present invention will now be described in detail with reference to the Figures. FIGS. 1, 2 and 3 collectively make up a functional block diagram illustrating various portions of computer system (also called distributed data processing system) 100, including: co-browser server sub-system 102; content server sub-system 104; co-browser sub-systems 106 (user A), 108 (user B), 110 (user C), 112 (user D); communication network 114; co-browser server computer 200; communication unit 202; processor set 204; input/output (i/o) units 206; memory device 208; persistent storage device 210; display device 212; external device set 214; random access memory (RAM) device 230; cache memory device 232; and software module (or, simply, mod) 240. As shown in FIG. 3, software mod 240 includes: initiate sub-mod (or, simply s-m) 302; leader change s-m 310; and co-browse s-m 312. Leader change s-m includes: condition definition sub-sub-mod (or, simply, s-s-m) 320; condition detect s-s-m 322; effect change s-s-m 324; and notification s-s-m 326. Co-browse s-m 312 includes: navigate s-s-m 330; highlight s-s-m 332; and information (info) entry s-s-m 334.

As shown in FIG. 2, computer sub-system 102 is, in many respects, representative of the various computer sub-system (s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Software 240 is a representative software module, and is a collection of machine readable instructions and data that is used to create, manage and control certain software functions that will be discussed in detail below.

Server computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1, 2 and 3, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, co-browser server sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for use by sub-system 102.

Software module 240 is in many respects representative of the various software modules of the present invention and is stored in persistent storage 210 for access and/or execution by one or more of the respective computer processors 204, usually through one or more memories of memory 208. Persistent storage 210 is at least more persistent than a signal in transit is, but the persistent storage may, of course, be substantially less persistent than permanent storage. Mod 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 allows for input and output of data with other devices that may be connected locally in data communication with server computer 200. For example, I/O interface 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, mod 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Operation of Embodiment(s) of the Present Invention

Figure 4:
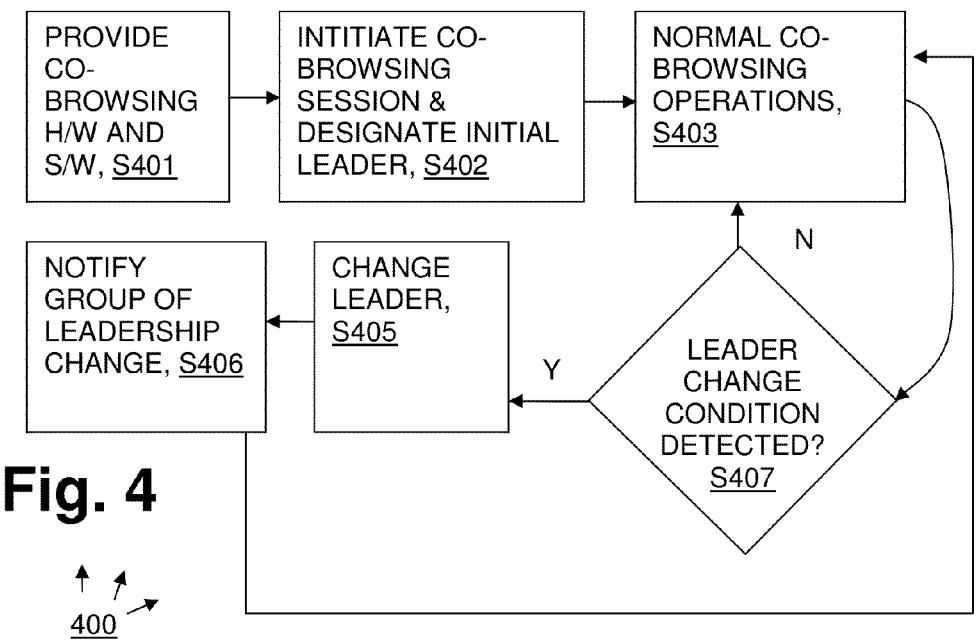
FIG. 4 is a flowchart showing a process according to the present invention.

Turning now to FIG. 4, FIG. 4 is a flowchart depicting process 400 according to the present invention. The various steps of process 400 will now be discussed in turn.

Processing begins at step S401 where computer system 100 (see FIGS. 1 to 3) is provided and distributed amongst: (i) co-browser server sub-system 102 which co-ordinates the co-browsing session; (ii) four users A, B, C and D (respectively using sub-systems 106, 108, 110, 112); and (iii) content server sub-system 104 that serves up the various web pages and associated files to the respective sub-systems of users A, B, C and D during the co-browsing session.

Processing proceeds to step S402 where initiate s-m 302 (see FIG. 3) initiates the co-browsing session and chooses the initial leader for the new co-browsing session. In this example, a co-browser may, at any given time, have one of two alternative roles: (i) leader; or (ii) non-leader. The co-browsing session is initiated as is conventional in the art of co-browsing sessions. The initial leader is determined in any one of a number of ways: (i) user who controlled the initiation of the co-browser session; (ii) highest ranking employee in the co-browsing session; (iii) randomly; (iv) chosen by participant input; and/or (v) other method now conventional or to be developed in the future. In this embodiment: (i) there must be a leader at all times; (ii) there must only be a single leader at any given time; (iii) every user participating in the co-browsing session will have a browser tab open to a "co-browsing web page" that is chosen and changed by the leader; and (iv) participants may have additional web pages open, in addition to the co-browser tab with the co-browser web page. Alternative embodiments may vary with respect to features (i) to (iv) identified in the previous sentence, and those of skill in the art will understand that co-browser systems may generally vary widely in their user interface details, controlling rules and/or other implementation details.

At the time of the initiation of S402, user A (who started the co-browsing session) and users B and C are present, but user D (who happens to be the manager of A, B and C) is not yet present because she has been held up in an important business meeting. In the session covered by process 400 of FIG. 4, user A is the initial leader because user A initiated the session.

Alternative embodiments of the present invention may have different roles than the leader/non-leader roles of the present invention. As just one example, an alternative co-browsing system might have the following roles: (i) web page chooser, who chooses the web page active for the co-browsing session on an ongoing basis; (ii) spokesperson, who is responsible for typing in information into the co-browsing web page if it requires information to be provided by the user(s); (iii) highlighter, who highlights portions of the co-browsing web page on an ongoing basis in order to direct attention of the co-browsers to appropriate portions of the co-browsing web page; (iv) chatting observer; and (v) non-chatting observer. As will be appreciated from this example: (i) there may be more than two "roles;" and (ii) a single user may occupy more than one role at a time (depending upon how the role is designed by the system designer).

Processing proceeds to step S403 where co-browse sub-mod 312 (see FIG. 3) controls the co-browsing session as it transpires. Navigate s-s-m 330 controls which web page will be open in the co-browsing tab at any given time based on the navigation of the leader as performed at the leader's computer sub-system (initially co-browser A sub-system 106 (see FIG.

1) in the current example. The web pages are served from one or more content servers, such as content server sub-system 104 (see FIG. 1).

As shown in FIG. 3, highlight s-s-m 332 allows the leader to highlight portions of the co-browsing webpage for the other participants, and this highlighting will quickly show up on the display devices of their respective participant computer sub-systems. In this way, the leader can direct participant attention to relevant portions of a web page that is currently under review.

As shown in FIG. 3, information entry s-s-m 334 allows the leader to enter information into websites. Information being entered may be any type of input that websites invite and/or receive. For example, such leader-entered information could include the following types of input: password entry, billing address entry, product ordering, manipulation of an avatar in a game or virtual reality environment, electronic signature, etc.

Returning to FIG. 4, processing proceeds to step S407, where condition detection s-s-m 322 of leader change s-m 310 detects whether any condition has occurred that would cause the co-browsing session leader to change automatically according to the present invention. In this example, co-browser participants may request the leader to change (as is currently convention), but this is not what is being detected at step S407. Rather, step S407 detects conditions that would cause the session leader to change automatically and without any request from the participants.

The applicable conditions, to be detected by s-s-m 322, are defined by condition definition s-s-m 320. In this example, the conditions that will cause an automatic change in leader (that is, the conditions that may be detected at step S407) are as follows: (i) text analysis on chat or conference transcript indicates that a change in leaders would be helpful; (ii) a non-leader participant has a web page open that is deemed more relevant than the co-browsing web page chosen by the leader; (iii) a non-leader participant highlights information on the co-browsing web page; (iv) a newly-joining participant, who meets predetermined leadership criteria, joins an ongoing co-browsing session; (v) passage of time; (vi) predetermined scheduling of leader changes; (vii) calendar information for the leader; and/or (viii) combinations of the forgoing conditions. This list of conditions is just one possible example and does not reflect all possible conditions that a system designer may choose in order to cause a responsive change in leadership. The various conditions on this list will each be discussed below in more detail after discussion of steps S405 and S406.

If a leader change condition is not detected at step S407 then processing proceeds back to step S403. If a leader change condition is detected at step S407, then processing proceeds instead to step S405, where the participant in the leader role is automatically changed by effect change s-s-m 324 (see FIG. 3) in response to detection of the leadership change condition. Alternatively, the detection of a leadership change condition may prompt leader change sub-mod 310 (see FIG. 3) to merely inquire with one or more of the participant(s) to determine whether a change is really wanted by the participants. However, whether the leadership change is simply made automatically, or merely requested to be made by the software, this should be understood to be different from any process where participant(s) request a leader change upon their own initiative. According to the present invention, the participants do not need to request a change upon their own initiative, and, at least in some embodiments, the change itself will be made with the necessity of receiving user input regarding this change.

As shown in FIG. 4, processing proceeds from step S405 to S406, where notification s-s-m 326 (see FIG. 3) notifies the participants that the leader has been changed. Processing proceeds to step S403. When the co-browsing session is terminated, then step S403 ends, but the termination of the co-browsing session is conventional, not particularly relevant to the present invention, and not separately shown in flow chart 400.

Eight (8) examples of possible leadership change conditions were identified above in the discussion of step S407. These leadership change conditions will now be discussed in more detail in the following paragraphs.

Figure 5A:
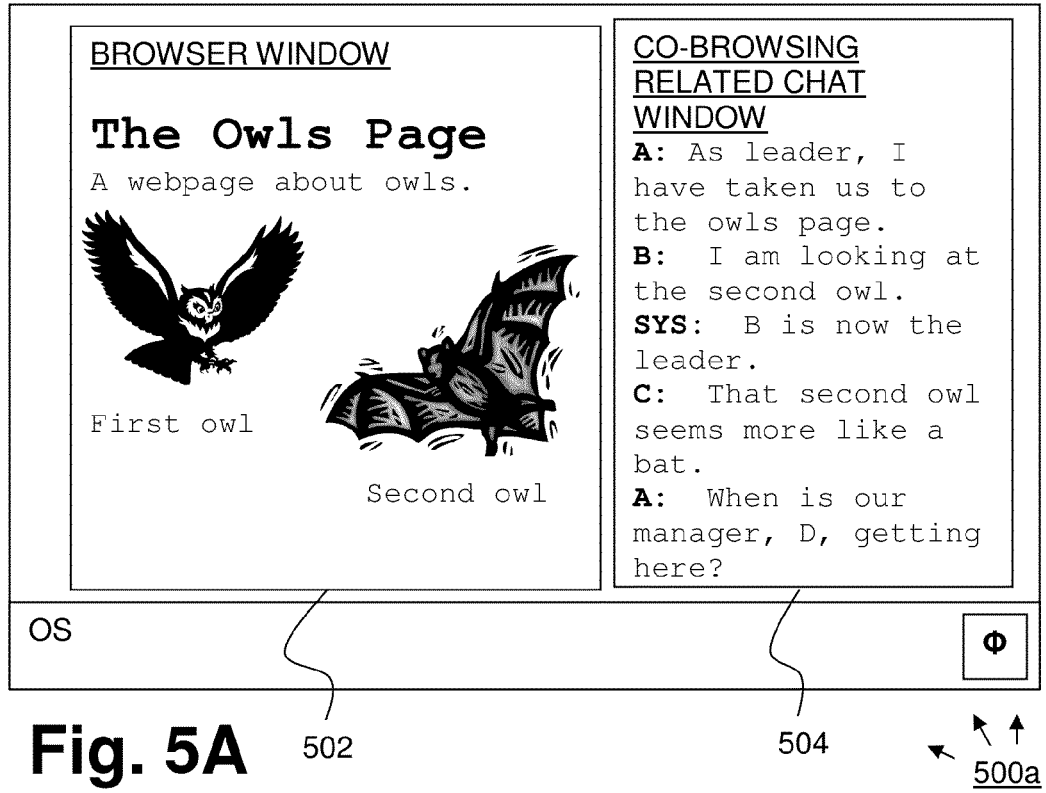
FIG. 5A is a first screenshot generated by the first embodiment computer system.

Condition (i): text analysis on chat or conference transcript indicates that a change in leaders would be helpful. FIG. 5A shows screenshot 500a including browser window 502 (showing the current co-browsing window or tab); and co-browser chat window 504. Screenshot 500a is the display that would be displayed to user C, a non-leader participant in the co-browsing session. At the beginning of this session, user A is the leader and, in her role of leader, has caused "The Owls Page" to show up as the current co-browser web page, for users C and B (user D is not yet participating as she is still on a business call). In this example, condition detection s-s-m 322 will determine that the topic of the co-browsing session is "owls" in one, or more, of several ways: (i) calendar invite information related to the co-browsing session; (ii) the fact that leader A has launched a page that is focused primarily on the subject of owls; and/or (iii) the fact that leader A has explicitly mentioned in the subject of "owls" in the chat session related to the co-browsing session. After "The Owls Page" web page has been displayed to all participants, in the chat window, B types: "I am looking at the second owl." This chat text (and all chat text) is subject to textual analysis by condition detection s-s-m 322 (see FIG. 3). In the case of B's comment, the text analysis indicates that B has now taken a leadership role in the discussion and should therefore be accorded the role of "leader" of the co-browsing session. Accordingly: (i) effect change s-s-m 324 makes B the new leader automatically; and (ii) notification s-s-m 326 notifies the participants of the leadership change in window 504. Although the chat is typed in this example, this kind of leadership change condition could also be applied to audio co-browsing chat. The textual or picture analysis that is done on the browser page can be the mechanism that sets the topic, so that when user B chats about the owl, then this may change the focus. In this way, the topic of the co-browsing session is auto-determined (or automatically changed), and is not necessarily changed by explicit instructions from any of the users.

With respect to condition (i), the text analysis could be "text analytics," or it could be a form of analysis less formal and/or analytically rigorous than proper text analytics.

Condition (ii): a non-leader participant has a web page open that is deemed more relevant than the co-browsing web page chosen by the leader. FIG. 5B shows screenshot 500b including browser window 506 (showing the current co-browsing window or tab); and co-browser chat window 508. Screenshot 500b reflects what user B would see at a certain point in time during the co-browsing session. As in the previous example, and as indicated in window 508, user A initiates the co-browsing session and starts out as leader. However, user A, in her role as leader, has assigned a topic of "owls" to the co-browsing session, but has gone to "The Blimps Page" web page, which is not particularly relevant to the topic of owls. User C, realizing that the co-browsing session is not going well has brought up "The Owls Page" on her own display and through her own browser (not the co-browser of the co-browsing session). While this is happening, user B complains that she is only seeing "The Blimps Page," and is not seeing the more relevant page called "The Owls Page." In response, in chat window 508, user C tells user B to just wait a bit because user C is familiar with the operation of the co-browsing software of the present invention, and therefore user C knows that she will soon be made leader because she has found the more relevant owls-related page, and that this condition will cause the leader role to automatically switch from user A to user C. Screenshot 500b is taken just before the system has made the leadership change, so the co-browsing window that user B sees is still "The Blimps Page."

Figure 5C:
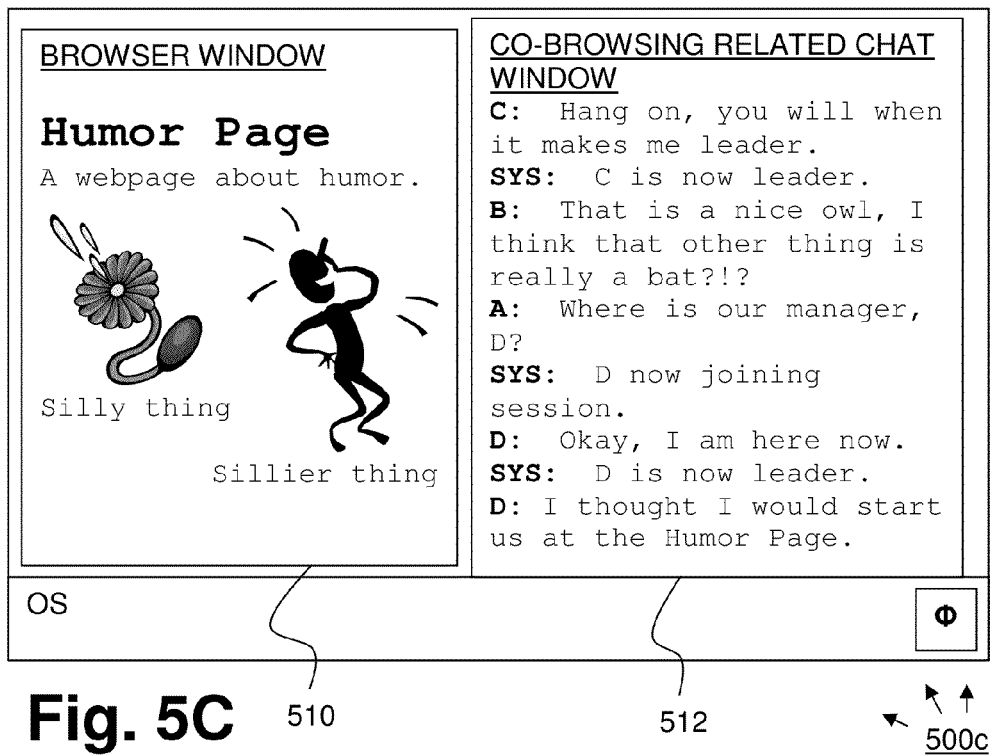
FIG. 5C is a third screenshot generated by the first embodiment computer system.

Moving to FIG. 5C, screenshot 500c is a screenshot displayed to user B some time after the screenshot 500b, discussed above. Screenshot 500c includes co-browsing window 510 and co-browsing chat window 512. To give an idea of the sequence of events, the newest few lines of chat in screenshot 500b (where user C tell user B to just wait a bit) are still present in the chat window of screenshot 500c. After that "SYS" (that is, text generated by the co-browsing software, rather than a participant) informs the participants that user C has been made leader according to the automatic leadership transfer discussed in the previous paragraph. Screenshot 500c will be discussed further, below, in conjunction with one of the other leadership change conditions that is used in this embodiment.

Condition (iii): a non-leader participant highlights information on the co-browsing web page. This condition is not shown in any of the screenshots 500a, b, c, but it means that a change would occur when one of the non-leader participants uses her I/O device to highlight, or otherwise draw attention to, something on a web page that is being co-browsed. In some embodiments, the role of highlighter may be separate from the role of leader. In a further variation, it may be that a non-leader highlighter needs to highlight repeatedly or frequently (according to some pre-defined standard for repeatedness and/or frequency) before the leadership role actually switches, as contrasted with a simpler scheme where a single instance of highlighting is sufficient to cause a role switch.

Condition (iv): a newly-joining participant, who meets predetermined leadership criteria, joins an ongoing co-browsing session. As shown by chat windows 504 and 512, in the example of FIGS. 5A to 5C, user D is the manager of the other users, but user D joins the co-browsing session a bit late. However, when user D does join the co-browsing session, as shown in window 512 of FIG. 5C, the software of the present invention automatically makes D the leader by automatically switching from C to D. At least in this particular embodiment, if one of the other users had joined the co-browsing session late, the other late user would not have been made a leader because the other users are not managers. In this example, D's manager status is the predetermined leadership criterion that causes the software to make her the leader upon her late joinder. Other leadership criteria are possible, such as length of service with the company or conceptual proximity between the employee-function of a user and the subject matter relevant to the co-browsing session.

Condition (v): passage of time. To explain more fully, a co-browsing session has a leader for a set period of time, and then the leader is automatically changed when that set period is exhausted. This condition may be useful for adversarial co-browsing sessions like debates and/or negotiations. In a variation on this condition, a leader's term could be measured in mouseclicks, number of pages visited, number of chat comments generated, or the like, rather than, or in addition to the mere passage of time.

Condition (vi): predetermined scheduling of leader changes. The co-browsers could, prior to the start of a co-browsing session, schedule who is to be a leader during the co-browsing session as it progresses. For example, user A could be scheduled as leader from 1:00 pm to 1:15 pm, followed by user C from 1:15 pm, followed by user D from 1:45 pm to the end of the schedule co-browsing session at 2:00 pm.

Condition (vii): calendar information for the leader. For this example, the co-browsing software would access the "calendar information" of various users. If a user's calendar showed that a conflict would occur between an item (for example, a meeting, a scheduled teleconference) on that user's calendar and the co-browsing session, then this could be used as a condition to automatically change the leader from the user with the conflict to one of the other users who does not have such a conflict. This change might automatically occur, for example, five (5) minutes before the conflict would spring into existence; and/or Condition (viii) combinations of the forgoing conditions. A system designer could use various combinations, or sub-combinations, of the foregoing conditions (as well as other possible conditions not appearing on this non-exclusive list) in order to build relatively complex algorithms for determining which user appears to be best suited for the role of leader (or other predetermined role) at any given time during the chat. As a simple example, leadership changes based on highlighting (see Condition (iii), above) could be prevented if the current leader is in a higher pay category than the user who is doing the highlighting.

Although the foregoing embodiment(s) of the present invention have been discussed in terms of the role of "leader," other embodiments of the present invention may help change co-browsers between other role(s), other than leader/non-leader.

The flowchart and block diagrams in the foregoing Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

III. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: non-exclusive or; for example, A and/or B means that: (i) A is true and B is false; or (ii) A is false and B is true; or (iii) A and B are both true.

User: includes, but is not necessarily limited to, the following: (i) a single individual human; (ii) an artificial intelligence entity with sufficient intelligence to act as a user; and/or (iii) a group of related users.

Role(s): one or more roles.

What is claimed is:

1. A method for managing a co-browsing session of multiple users where each respective user has at least one role selected from a set of at least two possible roles, the method comprising:

monitoring the co-browsing session to detect a condition; and responsive to detection of the condition, changing the role(s) of at least one user;

wherein:

at the changing step, the change of role(s) is made automatically and without human intervention;

at least the changing step is performed by computer software running on computer hardware;

the set of possible roles includes the following possible roles:

leader role, and non-leader role;

change of the role(s) of at least one user includes a change of role for a first user of the plurality of users from non-leader to leader role; and the condition is based, at least in part, upon at least one of the following: (i) a text analysis on chat or conference transcript indicates that a change in leaders would be helpful; (ii) a web page is opened by the first user; or (iii) highlighting of selected web page content, on the co-browsed web page, performed by the first user.

2. A computer program product for managing a co-browsing session of multiple users where each respective user has at least one role selected from a set of at least two possible roles, the computer program product comprising:

one or more non-transitory computer-readable storage media; and program instructions stored on the one or more computer-readable storage media;

wherein:

the program instructions include program instructions to: (i) monitor the co-browsing session to detect a condition, and (ii) responsive to detection of the condition, change the role(s) of at least one user;

the program instructions related to changing the role(s) of at least one user are programmed to change the role(s) automatically and without human intervention;

the set of possible roles includes the following possible roles:

leader role, and non-leader role;

change of the role(s) of at least one user includes a change of role for a first user of the plurality of users from non-leader to leader role; and the condition is based, at least in part, upon at least one of the following: (i) a text analysis on chat or conference transcript indicates that a change in leaders would be helpful; (ii) a web page is opened by the first user; or (iii) highlighting of selected web page content, on the co-browsed web page, performed by the first user.

* * * * *